ID=1

(12) United States Patent
Wang et al.

(10) Patent No.: US 7,467,174 B2
(45) Date of Patent: Dec. 16, 2008

(54) PROCESSING UNIT HAVING DECIMAL FLOATING-POINT DIVIDER USING NEWTON-RAPHSON ITERATION

(75) Inventors: Liang-Kai Wang, Madison, WI (US); Michael J. Schulte, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 762 days.

(21) Appl. No.: 10/983,105

(22) Filed: Nov. 5, 2004

(65) Prior Publication Data

US 2006/0064454 A1 Mar. 23, 2006

Related U.S. Application Data

(60) Provisional application No. 60/612,586, filed on Sep. 23, 2004.

(51) Int. Cl.
*G06F 7/487* (2006.01)
(52) U.S. Cl. .................................................. 708/504
(58) Field of Classification Search ................. 708/504
See application file for complete search history.

(56) References Cited

U.S. PATENT DOCUMENTS

| | | | | |
|---|---|---|---|---|
| 3,591,786 A | * | 7/1971 | Nelson | 708/652 |
| 4,635,220 A | | 1/1987 | Yabe et al. | |
| 4,692,891 A | | 9/1987 | Yamaoka et al. | |
| 4,817,048 A | * | 3/1989 | Rawlinson et al. | 708/650 |
| 4,999,801 A | * | 3/1991 | Katsuno | 708/500 |
| 5,515,308 A | * | 5/1996 | Karp et al. | 708/500 |
| 5,587,940 A | | 12/1996 | Ferguson | |
| 6,067,617 A | | 5/2000 | Webb et al. | |
| 6,769,006 B2 | * | 7/2004 | Krouglov et al. | 708/502 |
| 7,127,483 B2 | * | 10/2006 | Beaumont-Smith et al. | 708/504 |
| 2002/0143840 A1 | * | 10/2002 | Krouglov et al. | 708/654 |
| 2004/0167956 A1 | * | 8/2004 | Vihriala | 708/654 |

OTHER PUBLICATIONS

Liang-Kai Wang et al., "Decimal Floating-Point Division Using Newton-Raphson Iteration," Proceedings of the 15th IEEE International Conference on Application-Specific Systems, Architectures and Processors (ASAP'04), IEEE Computer Society Press, Sep. 2004, pp. 84-95.

Michael F. Cowlishaw, "Decimal Arithmetic FAQ: Part 1—General Questions," IBM Corporation, http://www2.hursley.ibm.com/decimal/decifaq1.html, Nov. 27, 2003, 7 pages.

(Continued)

*Primary Examiner*—David H Malzahn
(74) *Attorney, Agent, or Firm*—Shumaker & Sieffert, P.A.

(57) ABSTRACT

A decimal floating-point divider is described that implements efficient hardware-based techniques for performing decimal floating-point division. The divider uses an accurate piecewise linear approximation to obtain an initial estimate of a divisor's reciprocal. The divider improves the initial estimate of the divisor's reciprocal using a modified form of Newton-Raphson iteration. The divider multiplies the estimated divisor's reciprocal by the dividend to produce a preliminary quotient. The preliminary quotient is rounded to produce the final decimal floating-point quotient.

20 Claims, 9 Drawing Sheets

OTHER PUBLICATIONS

Michael F. Cowlishaw, "Decimal Floating-Point: Algorism for Computers," Proceedings of the 16th IEEE Symposium on Computer Arithmetic (ARITH '03), 2003, pp. 104-111.

Draft IEEE Standard for Floating-Point Arithmetic P754/D0.10.9, Apr. 6, 2005, http://754r.ucbtest.org/drafts/754r.pdf, 136 pages.

Fadi Y. Busaba et al., "The IBM z900 Decimal Arithmetic Unit," Proceedings of the 35th Asilomar Conference on Signals, Systems and Computers, vol. 2, IEEE Computer Society, Nov. 2001, pp. 1335-1339.

Michael F. Cowlishaw, "A Summary of Densely Packed Decimal Encoding," IEEE Proceedings—Computers and Digital Techniques ISSN 1350-2387, vol. 149, No. 3, pp. 102-104, May 2002. http://www2.hursley.ibm.com/decimal/DPDecimal.html.

Naofumi Takagi, "Powering by a Table Look-up and a Multiplication with Operand Modification," IEEE Transactions on Computers, vol. 47, No. 11, Nov. 1998, pp. 1216-1222.

Stuart F. Oberman et al., "Division Algorithms and Implementations," IEEE Transactions on Computers, vol. 46, No. 8, Aug. 1997, pp. 833-854.

Stuart F. Oberman et al., "An Analysis of Division Algorithms and Implementations," Technical Report: CSL-TR-95-675, Stanford University, Jul. 1995, pp. 1-51.

Eric M. Schwarz, "Rounding for Quadratically Converging Algorithms for Division and Square Root," Proceedings of the 29th Asilomar Conference on Signals, Systems and Computers, IEEE Computer Society, 1995, pp. 600-603.

Mark A. Erle et al., "Decimal Multiplication Via Carry-save Addition," Proceedings of IEEE International Conference on Application-Specific Systems, Architectures, and Processors, 2003, pp. 337-347.

David L. Chaum, "Untraceable Electronic Mail, Return Addresses, and Digital Pseudonyms," Communications of the ACM, vol. 24, No. 2, Feb. 1981, pp. 84-88.

* cited by examiner

US 7,467,174 B2

PROCESSING UNIT HAVING DECIMAL FLOATING-POINT DIVIDER USING NEWTON-RAPHSON ITERATION

This application claims the benefit of U.S. Provisional Application Ser. No. 60/612,586, filed Sep. 23, 2004, the entire content of which is incorporated herein by reference.

TECHNICAL FIELD

The invention relates to computing devices and, more particularly, to techniques for performing arithmetic operations within computing devices.

BACKGROUND

Commercial applications and databases typically store numerical data in decimal format. Currently, however, microprocessors do not provide instructions or hardware support for decimal floating-point arithmetic. Consequently, decimal numbers are often read into computers, converted to binary numbers, and then processed using binary floating-point arithmetic. Results are then converted back to decimal before being output or stored. Besides being time-consuming, this process is error-prone, since most decimal numbers cannot be exactly represented as binary numbers. Thus, if binary floating-point arithmetic is used to process decimal data, unexpected results may occur after a few computations.

In addition, most existing decimal dividers are for fixed-point (typically integer) decimal data types. As a result, scaling has to be done when working with numbers of different magnitudes. The process of scaling is also time-consuming and error-prone, and designs for fixed-point decimal dividers cannot be directly applied to floating-point decimal dividers.

In many commercial applications, including financial analysis, banking, tax calculation, currency conversion, insurance, and accounting, the errors introduced by converting between decimal and binary numbers are unacceptable and may violate legal accuracy requirements. Therefore, these applications often use software to perform decimal floating-point arithmetic. Although this approach eliminates errors resulting from conversion between binary and decimal numbers, it leads to long execution times for numerically intensive commercial applications, since software implementations of decimal floating-point operations are typically 100 to 1,000 times slower than equivalent binary floating-point operations in hardware.

SUMMARY

In general, the invention is directed to efficient hardware-based techniques for performing decimal floating-point division. More specifically, when performing decimal floating-point division, a processing unit described herein uses an accurate piecewise linear approximation to obtain an initial estimate of a divisor's reciprocal. The piecewise linear approximation employs operand modification and decimal encoding to reduce the memory requirements. The initial estimate of the divisor's reciprocal is then improved using a modified form of Newton-Raphson iteration that is appropriate for decimal data. The processing unit multiplies the divisor's reciprocal by the dividend to produce a preliminary quotient. The preliminary quotient is rounded using an efficient rounding scheme to produce the final decimal floating-point quotient.

In one embodiment, a method comprises receiving a decimal floating-point dividend and a decimal floating-point divisor with a decimal floating-point divider; and performing Newton-Raphson iterations with the decimal floating-point divider to output a decimal floating-point quotient.

In another embodiment, a method comprises receiving a decimal dividend and a decimal divisor with a decimal floating-point divider, accessing a lookup table to retrieve a decimal coefficient using a portion of the divisor as an index into the lookup table, and computing an initial approximation of the divisor's reciprocal based on the coefficient. The method further comprises iteratively computing an improved estimate of the divisor's reciprocal with the decimal floating-point divider, multiplying the dividend by the improved approximation of the divisor's reciprocal to produce a preliminary decimal quotient, computing a biased decimal quotient from the preliminary decimal quotient, and outputting a decimal quotient based on the biased decimal quotient.

In another embodiment, a processing unit comprises a decimal floating-point divider that performs Newton-Raphson iterations to output a decimal floating-point quotient.

In another embodiment, a decimal floating-point divider comprises inputs to receive a decimal floating-point dividend and a decimal floating-point divisor. The divider further comprises a nine's complement block and a decimal multiplier, wherein the nine's complement block and the decimal multiplier compute an initial approximation of the divisor's reciprocal, and wherein the decimal multiplier further (a) performs Newton-Raphson iterations to compute an improved approximation of the divisor's reciprocal based on the initial approximation, and (b) multiplies the dividend by the improved approximation to produce a preliminary decimal quotient, and (c) performs an adjustment on the preliminary decimal quotient to produce a biased decimal quotient, and (d) multiplies the divisor by the biased decimal quotient to generate signals for rounding and correction. The decimal floating-point divider further comprises a processing unit to output a decimal floating-point quotient based on the biased decimal quotient.

The techniques may provide one or more advantages. For example, the hardware-based techniques employed by the processing unit may provide a much faster computation time than conventional software packages, which typically must emulate decimal arithmetic. In addition, performing the division as decimal division instead of converting from decimal to binary form may avoid errors introduced by such conversions.

Moreover, the disclosed techniques employ Newton-Raphson iteration, which approximately doubles the number of accurate digits each iteration, compared to conventional decimal dividers that use digit recurrence algorithms and only produce one decimal digit each iteration. As a result, the described processing unit may achieve accurate decimal division in relatively few iterations.

As another example, compared to conventional piecewise linear approximations that require the use of a decimal multiply-accumulate unit and two coefficients read from memory, some embodiments of the invention may only require the use of a decimal multiplier and a single coefficient read from memory. Further, the same decimal multiplier may be used to perform the Newton-Raphson iteration, final multiplication, and rounding, thereby conserving chip area.

In addition, the techniques provide a divider for floating-point decimal data types. The invention may thus avoid the scaling problems associated with fixed-point dividers. A preferred embodiment of the invention is designed to be compliant with a draft of the revised version of the IEEE 754 Standard for Floating Point Arithmetic.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
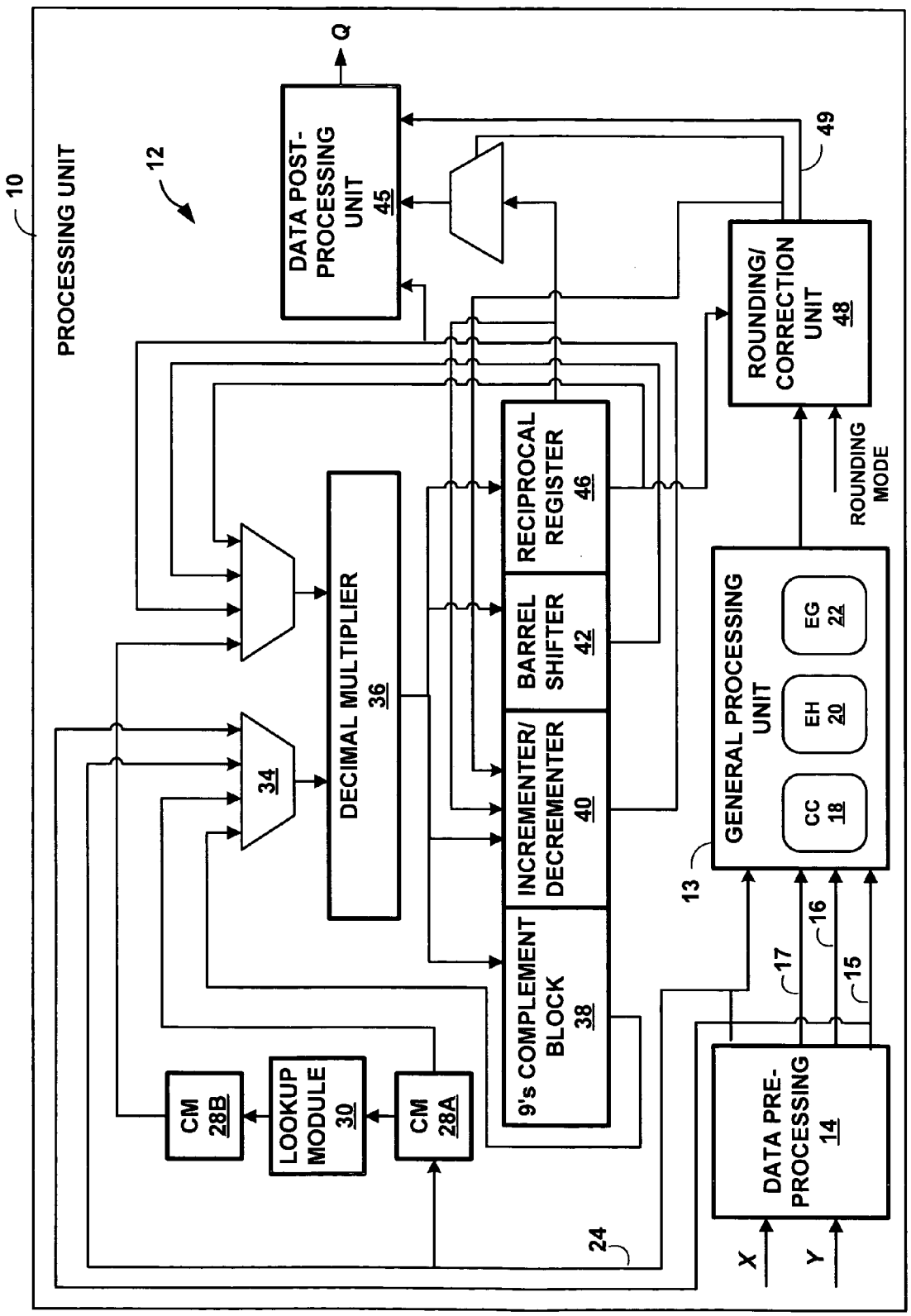
FIG. 1 is a block diagram illustrating a processing unit that performs decimal floating-point division in accordance with the techniques of the invention.

FIG. 1 is a block diagram illustrating a portion of a processing unit 10 that performs decimal division in accordance with the techniques of the invention. In particular, processing unit 10 includes one embodiment of a decimal floating-point divider 12 ("divider 12") for performing floating-point decimal division. In one embodiment, divider 12 is a 64-bit decimal floating-point divider. Divider 12 may, however, be modified to support arithmetic operations on decimal floating-point numbers of different bit lengths, such as 32-bit or 128-bit decimal floating-point numbers. Divider 12 may also be modified to support arithmetic operations on decimal fixed-point numbers.

As illustrated in FIG. 1, divider 12 operates to compute a quotient Q from a chosen dividend Y and a divisor X, where Q, Y and X are decimal floating-point numbers. Data preprocessing unit 14 first unpacks and converts X and Y for internal processing. For example, preprocessing unit 14 may convert the coefficients for X and Y from an IEEE-754 decimal format to a binary coded decimal (BCD) format, as described in further detail below. Data preprocessing unit 14 normalizes coefficients of X and Y such that the most significant digit of each number is non-zero. This allows the coefficients to be viewed as having the range $0.1 \leq Y < 1.0$ and $0.1 \leq X < 1.0$.

Initially, divider 12 uses an accurate piecewise linear approximation to obtain an initial estimate of a divisor's reciprocal. As described in detail below, divider 12 utilizes conversion modules (CMs) 28A-28B (collectively, "conversion modules 28") and lookup module 30 to generate a coefficient in BCD form for use in calculating the initial estimate. Divider 12 then utilizes fixed-point decimal multiplier 36 ("decimal multiplier 36"), 9's complement block 38, barrel shifter 42 and reciprocal register 46 to compute the initial estimate of a divisor's reciprocal using a piecewise linear approximation.

Divider 12 utilizes these components to refine the estimate of the divisor's reciprocal using a modified form of Newton-Raphson iteration. In the embodiment shown, decimal multiplier 36 receives input operands from eight different sources and outputs results to four sub-blocks for further processing.

Decimal multiplier 36 may be a high-speed sequential or parallel decimal multiplier. For example, decimal multiplier 36 may be a sequential decimal fixed-point multiplier that uses carry-save addition to accumulate the partial products, leading to a short critical path delay. In certain embodiments, decimal multiplier 36 may perform multiplication in ($n_{mult}$+ 6) cycles, where $n_{mult}$ is the number of significant digits in the multiplier operand. Decimal multiplier 36 may also make use of fast generation of multiplicand multiples, decimal (3:2) counters and (4:2) compressors, and a simplified decimal carry-propagate adder to produce the correct quotient. In addition, early exit may provide the opportunity to finish the multiplication in less time when the multiplier operand is short, reducing the time needed to perform the initial reciprocal approximation and early Newton-Raphson iterations.

Divider 12 further contains general processing unit 13 that includes coefficient comparator ("CC" in FIG. 1) 18, exceptions handler ("EH") 20, and exponent generator ("EG") 22. Coefficient comparator 18 performs a comparison of Y's coefficient 15 and X's coefficient 24 to determine proper alignment at rounding. Exceptions handler 20 detects special input operand values (NaNs, ±∞, and ±0) and exceptions (e.g., Invalid Operation and Divide-by-Zero). Y's exponent 16 and X's exponent 17 travel from data preprocessing unit 14 to exponent generator 22, which computes quotient Q's exponent 49 and signals the potential for overflow or underflow.

Rounding/correction unit 48 rounds the quotient. Data post-processing unit 45 combines the sign, exponent, and coefficient to output the quotient Q in IEEE-754R decimal format.

Processing unit 10 may be a microprocessor or coprocessor for use within a laptop computer, general-purpose computer or high-end computing system. Alternatively, processing unit 10 may be a microcontroller, application specific integrated circuit (ASIC) or other component. Moreover, processing unit 10 may be implemented as a single integrated circuit in which divider 12 constitutes only a portion of the implemented functionality. Alternatively, divider 12 may be implemented in one or more stand-alone integrated circuits. Components of processing unit 10 and divider 12 may be implemented as discrete combinational and sequential logic, logic arrays, microcode, firmware or combinations thereof.

Figure 2:
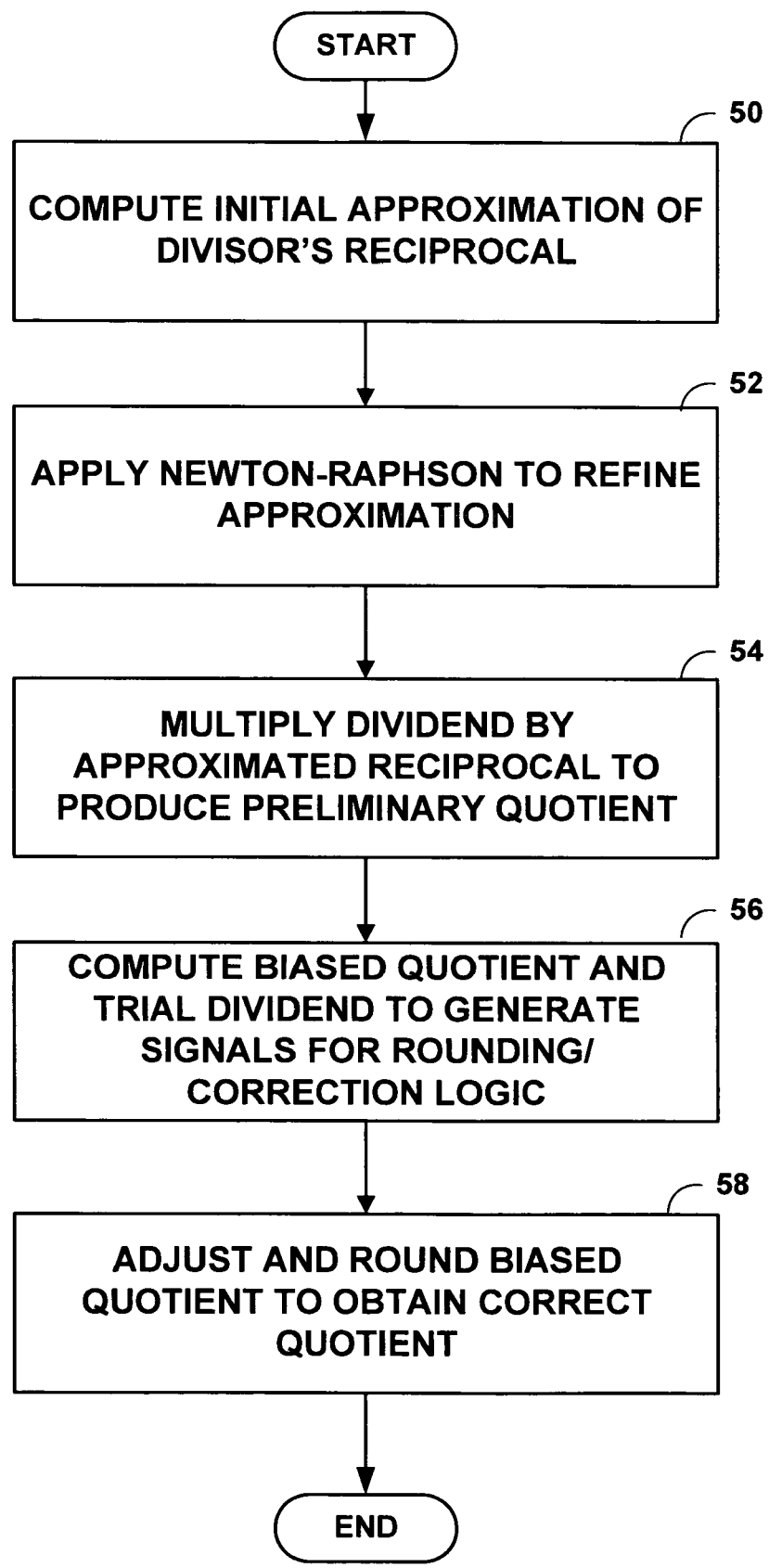
FIG. 2 is a flow diagram illustrating exemplary operation of the decimal floating-point divider of FIG. 1.

FIG. 2 is a flow diagram illustrating exemplary operation of a decimal floating-point divider, such as divider 12 (FIG. 1), performing decimal floating-point division in accordance with the techniques of the invention. FIG. 2 provides an overview of the decimal floating-point division process, which contains four major operations. Through the decimal floating-point division process, divider 12 obtains a quotient Q from a dividend Y and a divisor X. Y and X correspond to normalized decimal significands that are viewed as fractions, such that $0.1 \leq Y < 1.0$ and $0.1 \leq X < 1.0$. Without loss of generality, it is also assumed that $Y \leq X$, which gives $0.1 < Q \leq 1$.

Initially, divider 12 computes an approximation of the divisor's reciprocal, $1/X \approx R_0$ (50). The accuracy of this initial approximation will affect the number of Newton-Raphson iterations needed to obtain a correct quotient having a desired accuracy. Next, divider 12 applies Newton-Raphson iterations to refine the approximation of the divisor's reciprocal (52). Newton-Raphson iteration is an iterative method used to approximate the root of a non-linear function. Divider 12 uses a modified version of the first-order Newton-Raphson division algorithm to approximate 1/X given the initial reciprocal approximation $R_0$. Divider 12 performs m Newton-Raphson iterations to produce an improved reciprocal approximation, $R_m$.

In the third operation, decimal multiplier 36 multiplies $R_m$ and the dividend Y to produce a preliminary quotient Q' (54). In the fourth operation, incrementer 40 performs an adjustment (e.g., an addition) to the preliminary quotient Q' to obtain a biased quotient Q", and multiplies Q" with the divisor to generate a trial dividend which is used to produce required signals for rounding/correction logic unit 48 (56). In the fifth operation, divider 12 adjusts and rounds the biased quotient Q" to obtain the correct quotient, Q (58). Although shown sequentially in FIG. 2 for ease of illustration, the operations may be performed in a pipelined fashion.

Figure 3:
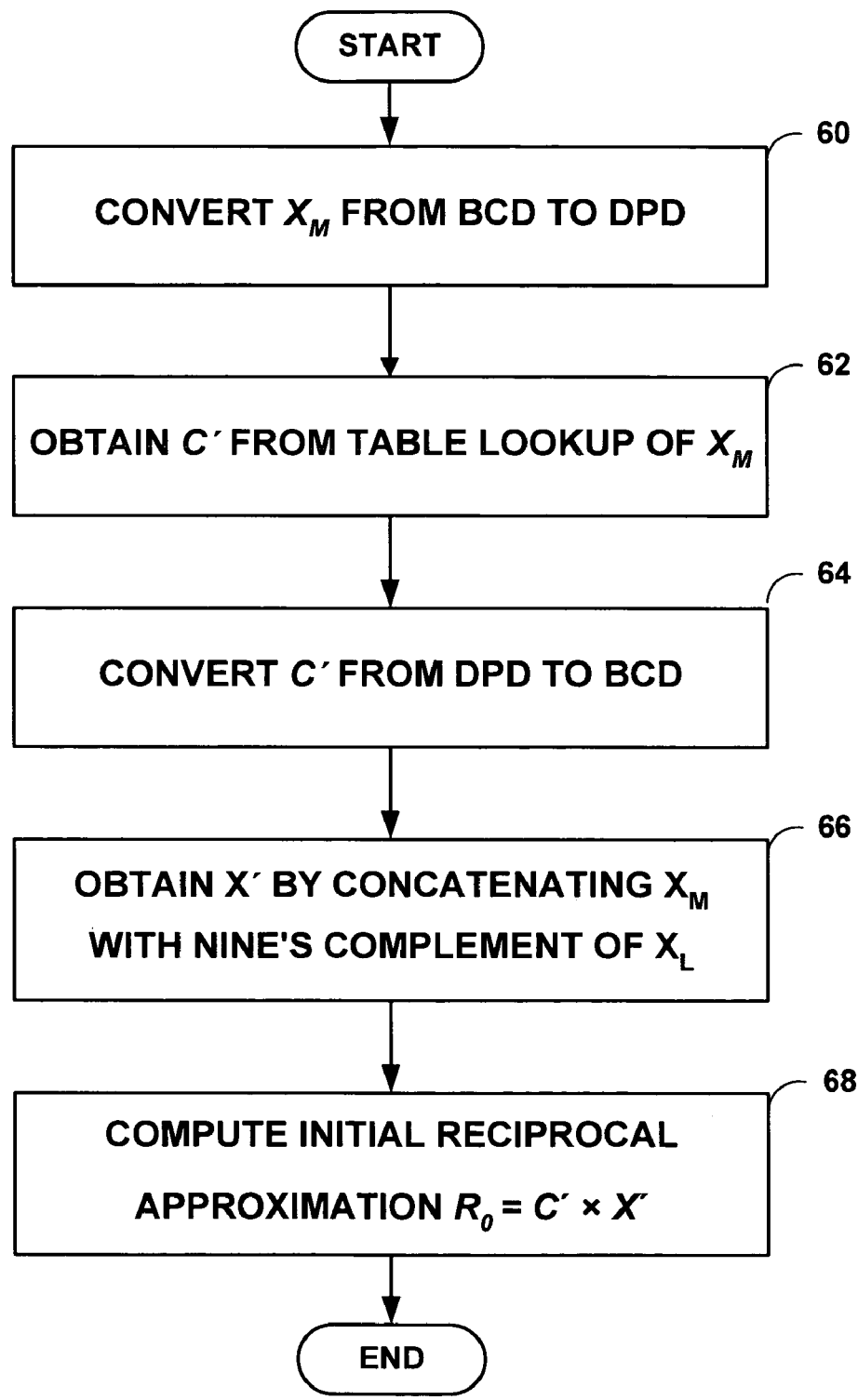
FIG. 3 is a flow diagram illustrating exemplary operation of the decimal floating-point divider computing an initial approximation of the divisor's reciprocal.

FIG. 3 is a flow diagram illustrating exemplary operation of a decimal floating-point divider, such as divider 12 (FIG. 1), computing the initial approximation of the divisor's reciprocal.

In practice, divider 12 inputs the value of $X_M$ into conversion module (CM) 28A, which converts $X_M$ from a binary coded decimal (BCD) format to a densely-packed decimal (DPD) encoded version (60). The converted $X_M$ is input into lookup module 30 to obtain coefficient $C'=1/(X_M+5\times10^{-k-1})^2$ truncated to 2k digits (2 integer digits and 2k–2 fraction digits) (62). Lookup module 30 is indexed by the k most significant digits of the divisor's significand in DPD format and outputs C' in DPD format. Conversion module 28B converts C' from DPD to BCD using two-level logic (64). In addition, CM 28A converts $X_L$ to its nine's complement, and then concatenates $X_M$ with $\overline{X_L}$ to form X' (66).

Simple conversion logic, which takes roughly two gate delays, may be used for these conversions. One reason for this conversion is to reduce the size of lookup module 30. Since DPD represents 3 decimal digits using just 10 bits, this approach reduces the size of the table lookup to roughly $2^p \times 2p$, where $p=\lceil(k*10)/3\rceil$. For example, with k=3 the size of the memory lookup is reduced from 12 Kbytes to only 2.5 Kbytes. C' is output to decimal multiplier 36 for processing.

Decimal multiplier 36 (FIG. 1) receives X' and C' and computes the reciprocal approximation of the divisor, $R_0$, as $1/X \approx R_0 = C' \times X'$ (68). Although shown sequentially in FIG. 3 for ease of illustration, the operations may be performed in pipelined fashion.

The initial approximation is based on a piecewise first order Taylor series expansion, which approximates a function f(X) close to the point A as:

$$f(X) \approx f(A) + f'(A) \times (X-A). \quad (eq. 1)$$

To obtain the initial approximation, divider 12 divides the n-digit divisor, $X=[0.X_{n-1}X_{n-2}\ldots X_0]$, into a k-digit more significant part, $X_M=[0.X_{n-1}X_{n-2}\ldots X_{n-k}]$, and an (n–k)-digit less significant part $X_L=[X_{n-k-1}X_{n-k-2}\ldots X_0]10^{-k}$. Using $X_M$ as the input to a table lookup divides the original input interval [0.1, 1) into subintervals of size $10^{-k}$. On the subinterval $[X_M, X_M+10^{-k})$, a standard piecewise Taylor series expansion of f(X)=1/X about the subinterval midpoint $A=X_M+5\times10^{-k-1}$ has the form:

$$1/X \approx \frac{1}{X_M + 5\times10^{-k-1}} - \quad (eq. 2)$$
$$\frac{1}{(X_M + 5\times10^{-k-1})^2} \times (X - (X_M + 5\times10^{-k-1}))$$
$$\approx \frac{2\times X_M - X + 10^{-k}}{(X_M + 5\times10^{-k-1})^2}.$$

Since $(2\times X_M - X = X_M - X_L)$ and $(10^{-k} - X_L)$ corresponds to the ten's complement of $X_L$, Equation (2) can be rewritten as:

$$1/X \approx \frac{X_M + 10^{-k} - X_L}{(X_M + 5\times10^{-k-1})^2} \quad (eq. 3)$$
$$\approx \frac{X_M + \overline{X_L} + 10^{-n}}{(X_M + 5\times10^{-k-1})^2}$$

where $\overline{X_L}$ is the nine's complement of $X_L$ and $10^{-n}$ may be added to obtain the ten's complement of $X_L$. Thus, the reciprocal approximation $R_0$ can be obtained as $1/X \approx R_0 = C' \times X'$ where $$C' = \frac{1}{(X_M + 5\times10^{-k-1})^2} \quad (eq. 4)$$
$$X' = X_M + \overline{X_L} + 10^{-n}.$$

The approximation error, $\epsilon_{approx}$, from this method is upper-bounded by the second-order term of the Taylor series expansion at A, which gives:

$$|\epsilon_{approx}| \leq \frac{1}{2} f''(A)(X-A)^2 \quad (eq. 5)$$
$$\leq \frac{1}{(X_M + 5\times10^{-k-1})^3}(X - (X_M + 5\times10^{-k-1}))^2$$
$$\leq \frac{1}{(X_M + 5\times10^{-k-1})^3}(X_L - 5\times10^{-k-1})^2.$$

Since $0.1 \leq X_M < 1$ and $0 \leq X_L < 10^{-k}$, $\epsilon_{approx}$ is bounded by $$|\epsilon_{approx}| < \frac{1}{(0.1 + 5\times10^{-k-1})^3}(0 - 5\times10^{-k-1})^2 \quad (eq. 6)$$
$$< \frac{25\times10^{-2k-2}}{0.1^3}$$
$$< \frac{10^{-2k+3}}{4}.$$

When computed with infinite precision, $\epsilon_{approx} \leq 0$, such that $R_0 \leq 1/X$, since the piecewise linear Taylor series expansion of 1/X always under-approximates 1/X.

In practice, divider 12 uses the nine's complement of the most significant digits of $X_L$ instead of the ten's complement of $X_L$, stores only the most significant digits of C' in table lookup module 30, and truncates the product C'×X'. Nine's complement block 38 may obtain the nine's complement of $X_L$ from $X_L$ using only simple two-level logic. Since the absolute value of the approximation error in the initial estimate is less than $10^{-k+3}/4$, the goal is to limit the overall error in the initial estimate to less than $10^{-2k+3}$, so that the initial approximation is still accurate to at least (2k−3) fraction digits. A second goal is to ensure that the error in the initial approximation is less than zero, since this simplifies the Newton-Raphson iteration and final rounding. For the initial approximation, only the 2k most significant digits of X' and C' are used and $R_0$ is truncated to 2k−1 digits. Thus, the value actually computed by divider 12 for the initial approximation is $$R_0 = C' \times X' + \varepsilon_{R_0} \qquad \text{(eq. 7)}$$
$$= (C' + \varepsilon_{C'}) \times (X' + \varepsilon_{X'}) + \varepsilon_{trunc} + \varepsilon_{approx},$$

where $\varepsilon_{C'}$, $\varepsilon_{X'}$, and $\varepsilon_{trunc}$ correspond to the errors due to truncating C', X', and $R_0$, respectively. Consequently, $$\varepsilon_{R0} = X' \times \varepsilon_{C'} + C' \times \varepsilon_{X'} + \varepsilon_{C'} \times \varepsilon_{C'} + \varepsilon_{trunc} + \varepsilon_{approx}. \qquad \text{(eq. 8)}$$

Since $0.1 \leq X' < 1.0$, $1.0 < C' < 100$, and $1 < R_0 < 10$, we have $-10^{-2k+2} \leq \varepsilon_{C'} \leq 0$, $10^{-2k} < \varepsilon_{X'} < 0$, $-10^{-2k+2} < \varepsilon_{trunc} \leq 0$, which gives the bounds:

$$1.0 \times (-10^{-2k+2}) + 100 \times (-10^{-2k}) + (-10^{-2k+2}) + (-2.5 \times 10^{-2k+2}) \leq \varepsilon_{R0} < 0 - 0.55 \times 10^{-2k+3} < R_0 < 0. \qquad \text{(eq. 9)}$$

Thus, if the k most significant digits of X are used to access a table lookup, where each entry contains 2k digits, the initial approximation is accurate to more than 2k−3 fraction digits.

Figure 4:
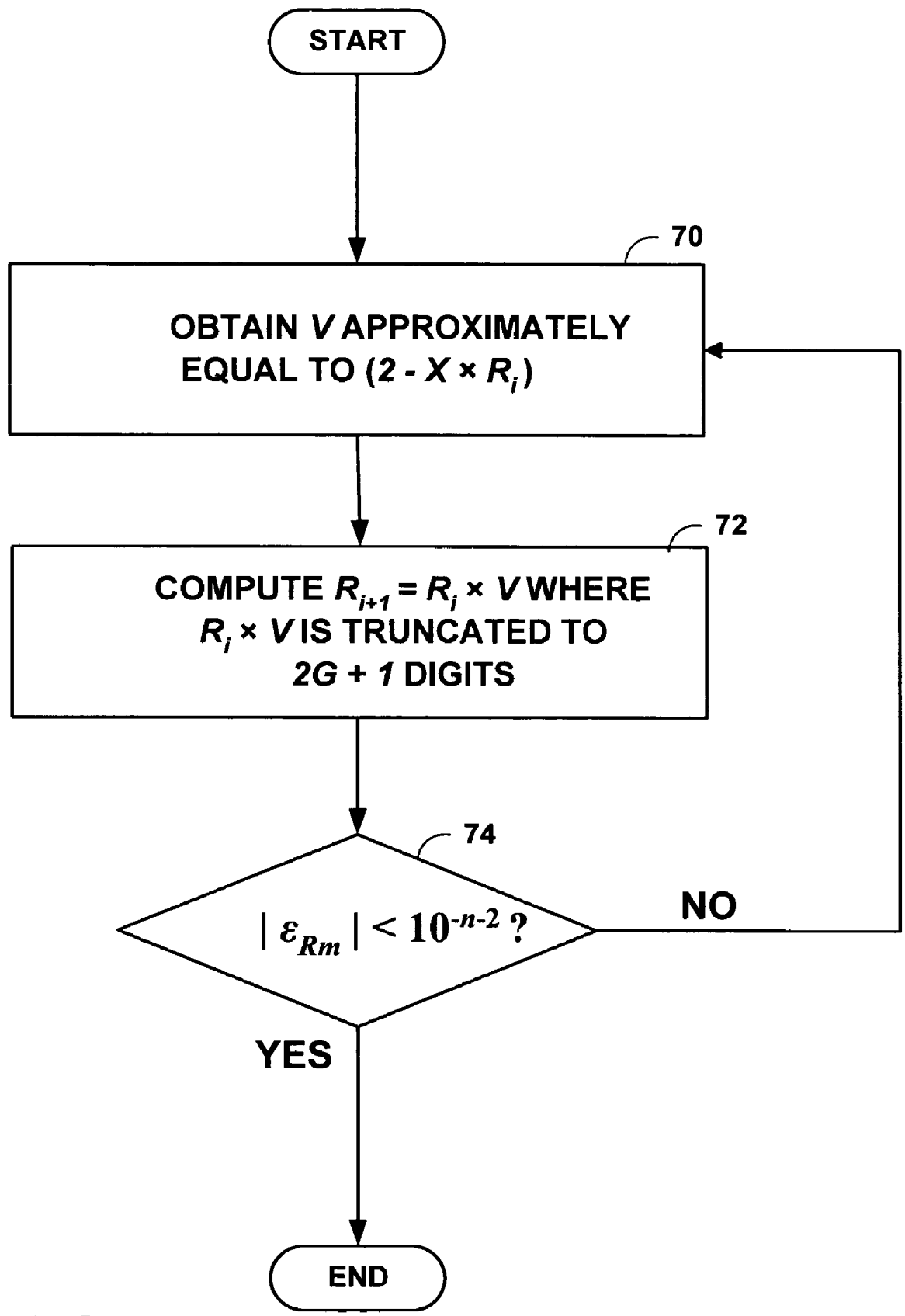
FIG. 4 is a flow diagram illustrating exemplary operation of the decimal floating-point divider applying a modified Newton-Raphson iteration to improve the approximation of the divisor.

FIG. 4 is a flow diagram illustrating exemplary operation of a decimal floating-point divider, such as divider 12 (FIG. 1), applying a modified Newton-Raphson iteration to refine the reciprocal approximation of the divisor. In particular, divider 12 performs m Newton-Raphson iterations to obtain an improved reciprocal approximation $R_m$, where $-10^{-n-2} < \varepsilon_{Rm} < 0$.

The invention uses a modified (e.g., optimized) version of the first-order Newton-Raphson division algorithm to approximate 1/X given the initial reciprocal approximation $R_0$. In the modified version described herein, the Newton-Raphson iteration consists of two general operations. Decimal multiplier 36 and nine's complement block 38 performs the first operation of the Newton-Raphson iteration, approximating $V \approx (2 - X \times R_i)$ by taking the nine's complement of the 2G+2 most significant fraction digits of $X \times R_i$ and setting the integer digit to one (70), where G is the number of accurate digits of $R_i$. Divider 12 then inputs the approximated value of V back into decimal multiplier 36, which performs the second operation of the Newton-Raphson iteration, multiplying $R_i$ by V to obtain $R_{i+1}$, where $R_i \times V$ is truncated to 2G+1 fraction digits (72). Barrel shifter 42 shifts $R_i$ to reduce the latency of multiplication. Reciprocal register 46 stores temporary results generated by each of the iterations. Although shown sequentially for ease of illustration, the operations may be performed in pipelined fashion.

The first order Newton-Raphson iterative equation for division is:

$$R_{i+1} = R_i \times (2 - X \times R_i). \qquad \text{(eq. 10)}$$

Since $R_i = 1/X + \varepsilon_{Ri}$, where $\varepsilon_{Ri}$ is the error in iteration i, Equation (10) can be rewritten as:

$$R_{i+1} = \left(\frac{1}{X} + \varepsilon_{R_i}\right) \times \left(2 - X \times \left(\frac{1}{X} + \varepsilon_{R_i}\right)\right). \qquad \text{(eq. 11)}$$

Since $R_i < 1/X$, then $X \times R_i < 1$ and $X \times R_i \approx 1$, which allows $2 - X \times R_i$ to be approximated by taking the nine's complement of the fraction digits of $X \times R_i$ and setting the integer digit to one. Full precision multiplications are also avoided, which results in the new iterative equation:

$$R_{i+1} = \left(\frac{1}{X} + \varepsilon_{R_i}\right) \times (1 - X \times \varepsilon_{R_i} + \varepsilon_{m1}) + \varepsilon_{m2}, \qquad \text{(eq. 12)}$$

where $\varepsilon_{m1}$ is the error due to truncating $X \times R_i$ and taking its nine's complement to get $V \approx 2 - X \times R_i$ and $\varepsilon_{m2}$ is the error due to truncating $R_i \times V$. Equation (12) can then be rewritten as:

$$\varepsilon_{R_{i+1}} = R_{i+1} - \frac{1}{X} = \frac{\varepsilon_{m1}}{X} - X \times \varepsilon_{R_i}^2 + \varepsilon_{R_i} \times \varepsilon_{m1} + \varepsilon_{m2}. \qquad \text{(eq. 13)}$$

The error in the initial reciprocal approximation $R_0$ is bounded by $-0.55 \times 10^{-G} < \varepsilon_{R0} < 0$, where G=2k−3. Truncating $X \times R_0$ to 2G+2 fraction digits and taking its nine's complement results in an error $\varepsilon_{m1}$, which is bounded by $-10^{-2G-2} \leq \varepsilon_{m1} < 0$. Similarly, truncating $X \times V$ to 2G+1 fraction digits results in an error $\varepsilon_{m2}$ that is bounded by $-10^{-2G-1} \leq \varepsilon_{m1} \leq 0$. In Equation (13), if $\varepsilon_{Ri} < 0$ then $\varepsilon_{Ri} \times \varepsilon_{m1} > 0$, $\varepsilon_{m1}/X < 0$, $-X \times \varepsilon_{R_i}^2 < 0$ and $\varepsilon_{m2} \degree 0$.

Since $\varepsilon_{Ri} \times \varepsilon_{m1} \leq -\varepsilon_{m1}/X$, it can be ignored when computing the error bounds, which gives:

$$|\varepsilon_{R_i}| < \frac{10^{-2G-2}}{0.1} + 1.0 \times (0.55 \times 10^{-G})^2 + 10^{-2G-1} < 0.5025 \times 10^{-2G}.$$

Each of the Newton-Raphson iterations more than doubles the number of accurate digits in the reciprocal approximation. By truncating the result of each multiplication and taking the nine's compliment of $X \times R_i$, it is guaranteed that $R_{i+1} < 1/X$, which simplifies computing $2 - X \times R_i$ and the final rounding. Newton-Raphson iteration continues for m iterations to obtain an improved reciprocal approximation $R_m$, where $|\varepsilon_{Rm}| < 10^{-n-2}$ (74). In practice, an iteration counter may be used, where i is initialized to zero, and the counter exits once i=m.

Figure 5:
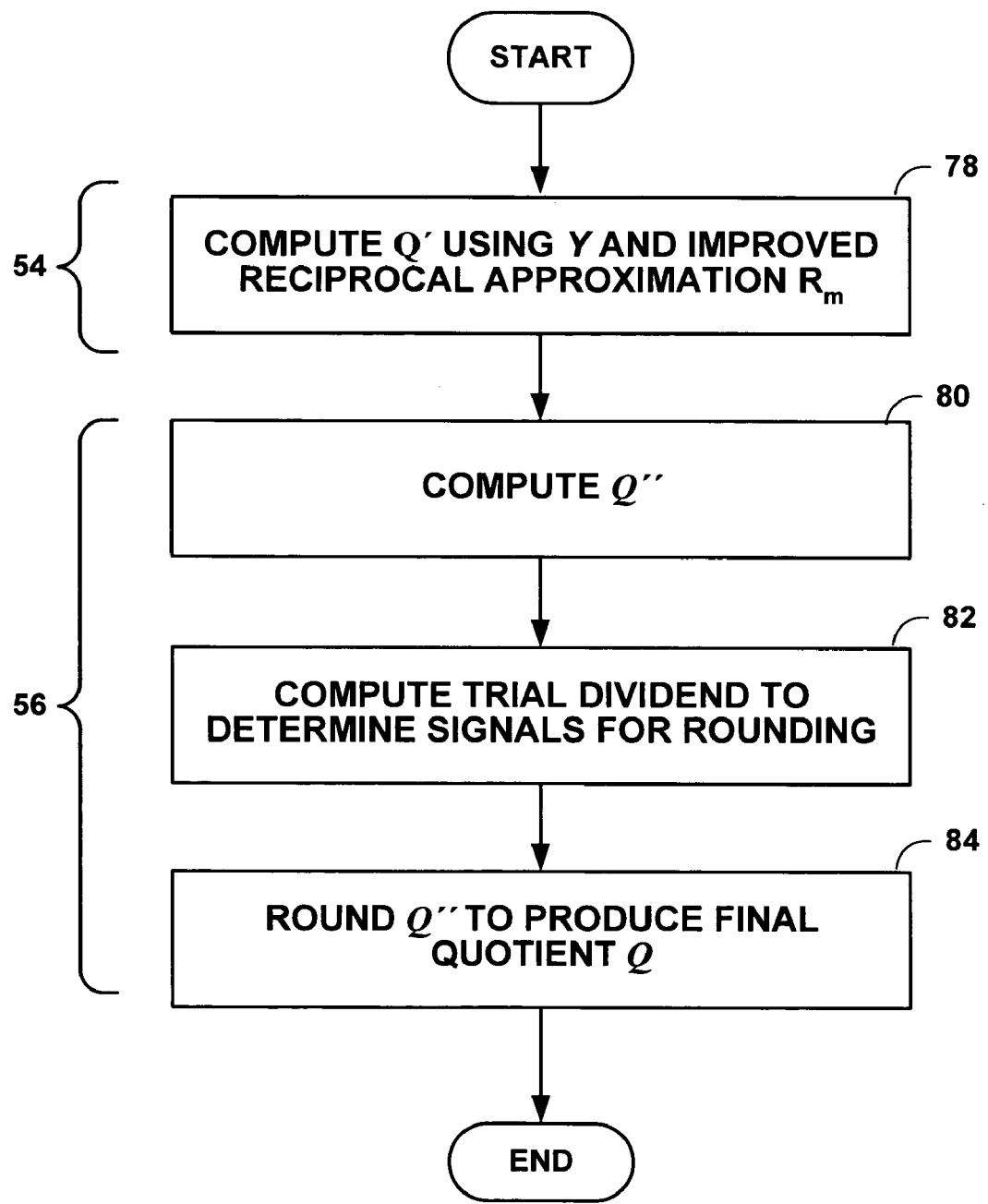
FIG. 5 is a flow diagram illustrating exemplary operation of the decimal floating-point divider adjusting and rounding a preliminary quotient to obtain a final decimal floating-point quotient.

FIG. 5 is a flow diagram illustrating in further detail exemplary operation of a decimal floating-point divider, such as divider 12 (FIG. 1), performing the steps of computing a preliminary quotient Q' (step 54 of FIG. 2), computing a biased quotient Q'', computing a trial dividend to determine the signals required in rounding, and adjusting and rounding a biased quotient to obtain a correct quotient (step 56 of FIG. 2). In one embodiment, the biased quotient is adjusted to produce a correctly rounded result in IEEE-754 decimal format. Although shown sequentially for ease of illustration in FIG. 5, the operations may be performed in pipelined fashion.

Once the final Newton-Raphson iteration is performed (FIG. 4), decimal multiplier 36 multiplies the dividend Y and reciprocal approximation $R_m$ produced by the modified Newton-Raphson technique to obtain a preliminary quotient Q'(78). Next, divider 12 computes biased quotient Q''(80).

Specifically, incrementer/decrementer 40 calculates Q" from Q' and computes $Q''_T 10^{-n}$ or $Q''_T - 10^{-n}$ according to a signal from rounding/correction unit 48. Incrementer/decrementer 40 may be simpler than a decimal adder/subtracter, since it may only need to add or subtract $10^{-n}$ or $10^{-(n+1)}$. Next, divider 12 computes a trial dividend by multiplying biased quotient Q" with the input divisor to determine the signals required in rounding/correction logic 48 (82).

Finally, divider 12 rounds Q" to produce the final quotient Q (84). Specifically, divider 12 selects a rounding mode from RNE, RNA, RPI, RMI, RTZ, RNT, and RAZ and provides the selected rounding mode to rounding/correction unit 48. Rounding/correction unit 48 outputs a signal to incrementer/decrementer 40 to select the correctly rounded quotient. Data post-processing unit 45 combines the sign, exponent, and coefficient to generate the quotient Q in IEEE-754R decimal format. TABLE 1 lists the abbreviations of the rounding modes supported by the rounding scheme described herein. The techniques described also support the RNT and RAZ rounding modes, which are considered useful in some financial applications.

TABLE 1

| | |
|---|---|
| RNE | Round to Nearest, Ties Round to Even Number |
| RNA | Round to Nearest, Ties Round Away from Zero |
| RNT | Round to Nearest, Ties Round Toward Zero |
| RPI | Round Toward Positive Infinity |
| RMI | Round Toward Negative Infinity |
| RTZ | Round Toward Zero |
| RAZ | Round Away from Zero |

Rounding/correction unit 48 receives the rounding mode input, and uses decimal multiplier 36 to determine the sign of the remainder, N, and if the remainder N is zero, where the value of the remainder is:

$$N = |Y| - |Q'| \times |X|. \tag{eq. 14}$$

The rounding direction is determined using the sign of the remainder, whether the remainder is zero, and additional information.

As discussed, the dividend is normalized to $0.1 < Y < 1.0$ and it is assumed that the dividend is less than or equal to the divisor, which gives $0.1 < Q \leq 1$. Decimal multiplier 36 obtains preliminary quotient Q' by multiplying the dividend by the divisor's reciprocal approximation. A small error between the correct quotient, Q, and the preliminary quotient, Q', may cause Q and Q' to round in different directions. For example, if $Q = 0.19 + 10^{-10}$, and $Q' = 0.19 - 10^{-10}$, when the rounding mode is round toward zero and the rounded quotient has n=7 digits, then Q rounds to 0.19, but Q' rounds to 0.1899999. To correctly round the quotient, incrementer/decrementer 40 first adjusts Q' to obtain the (n+1)-digit quotient, Q", by truncating Q' to (n+1) digits and then adding $10^{-(n+1)}$ to the result (80). This technique is similar to that used in some binary division schemes. The error then becomes:

$$-10^{-(n+1)} \leq Q - Q'' \leq 10^{-(n+1)}. \tag{eq. 15}$$

Rounding/correction unit 48 uses Q" instead of Q' to determine both the sign of the remainder and whether the remainder is equal to zero. The $n^{th}$ fraction digit of Q" is called its least significant digit (LSD) and the $(n+1)^{th}$ fraction digit of Q" is called its guard digit (GD). With decimal division, the maximum difference between $Y = Q \times X$ and $Q'' \times X$ is bounded by:

$$-10^{-(n+1)} \times (1 - 10^{-n}) \leq \delta = Q \times X - Q'' \times X < 10^{-(n+1)} \times (1 - 10^{-n}). \tag{eq. 16}$$

As a result, the maximum absolute difference between Y and $X \times Q''$ is less than $10^{-(n+1)}$. Consequently, rounding/correction unit 48 compares the LSD of Y and the corresponding digit of $Q'' \times X$ to determine the sign of the remainder. If the LSD of Y is not equal to the $n^{th}$ fraction digit of $Q'' \times X$, the remainder is positive. Otherwise, the remainder is negative or zero. This is because Y only has n digits but $Q'' \times X$ has 2n+1 digits. The remainder is zero if all of the digits right of the $n^{th}$ digit in $Q'' \times X$ are zero, since this means that Q" is the exact quotient.

By observing the LSD and GD of Q", and the sign and equality with zero of the remainder, the correctly rounded quotient is selected as one of $Q''_T$, $Q''_T + 10^{-n}$, or $Q''_T - 10^{-n}$, where $Q''_T$ corresponds to Q" truncated to n digits. An action table, shown in TABLE 2, is used to determine the correct quotient.

TABLE 2

| LSB | GD | Remainder | RNE (+/−) | RNT (+/−) | RNA (+/−) | RPI (+/−) | RMI (+/−) | RTZ (+/−) |
|---|---|---|---|---|---|---|---|---|
| X | 0 | 0 | | $Q''_T$ | | | $Q''_T$ | |
| X | 0 | − | | | | $Q''_T / Q''_{T+}$ | $Q''_{T-} / Q''_T$ | $Q''_{T-} / Q''_{T+}$ |
| X | 0 | + | | | | $Q''_{T+} / Q''_T$ | $Q''_T / Q''_{T-}$ | $Q''_T$ |
| X | ≤4 | X | | | | | | |
| 1 | 5 | 0 | $Q''_{T+} / Q''_{T-}$ | $Q''_T$ | $Q''_{T+} / Q''_{T-}$ | | | |
| 1 | 5 | − | | $Q''_T$ | | | | |
| 1 | 5 | + | $Q''_{T+} / Q''_{T-}$ | | | | | |
| 0 | 5 | 0 | $Q''_T$ | $Q''_T$ | $Q''_{T+} / Q''_{T-}$ | | | |
| 0 | 5 | − | | $Q''_T$ | | | | |
| 0 | 5 | + | $Q''_{T+} / Q''_{T-}$ | | | | | |
| X | >5 | X | $Q''_{T+} / Q''_{T-}$ | | | | | |

In TABLE 2, LSB corresponds to the Least Significant Bit of the LSD of Q. GD corresponds to the guard digit of Q, X indicates that it does not matter what the value is, and (+/−) below each rounding mode corresponds to the sign of Q". Based on the LSB, GD, remainder, rounding mode, and sign of Q", the correctly rounded quotient is selected as one of $Q''_T$, $Q''_T + 10^{-n}$, or $Q''_T - 10^{-n}$. In TABLE 2, $Q''_{T+}$ denotes $Q''_T + 10^{-n}$ and $Q''_{T-}$ denotes $Q''_T - 10^{-n}$. For example, if LSB is 0, GD is 5, remainder is 0, the rounding mode is RNA, and the sign of the Q" is negative in the RNA mode, the correct quotient is equal to $Q''_T - 10^{-n}$.

Simulation Results

A 64-bit decimal floating-point divider embodiment of the invention was modeled, using the Newton-Raphson division algorithm described herein, in structural Verilog. In particular, a 0.11 micron CMOS standard cell library was used to synthesize certain embodiments of the invention. Under nominal operating conditions and a supply voltage of 1.2 Volts, the synthesized embodiment had a critical path delay of 0.75 ns, which occurred in the decimal barrel shifter. When implemented using a table lookup with k=3 and a sequential fixed-point multiplier that processes one digit per cycle, the divider took 163 cycles to implemented 64-bit (16-digit) decimal floating-point division.

Figure 6:
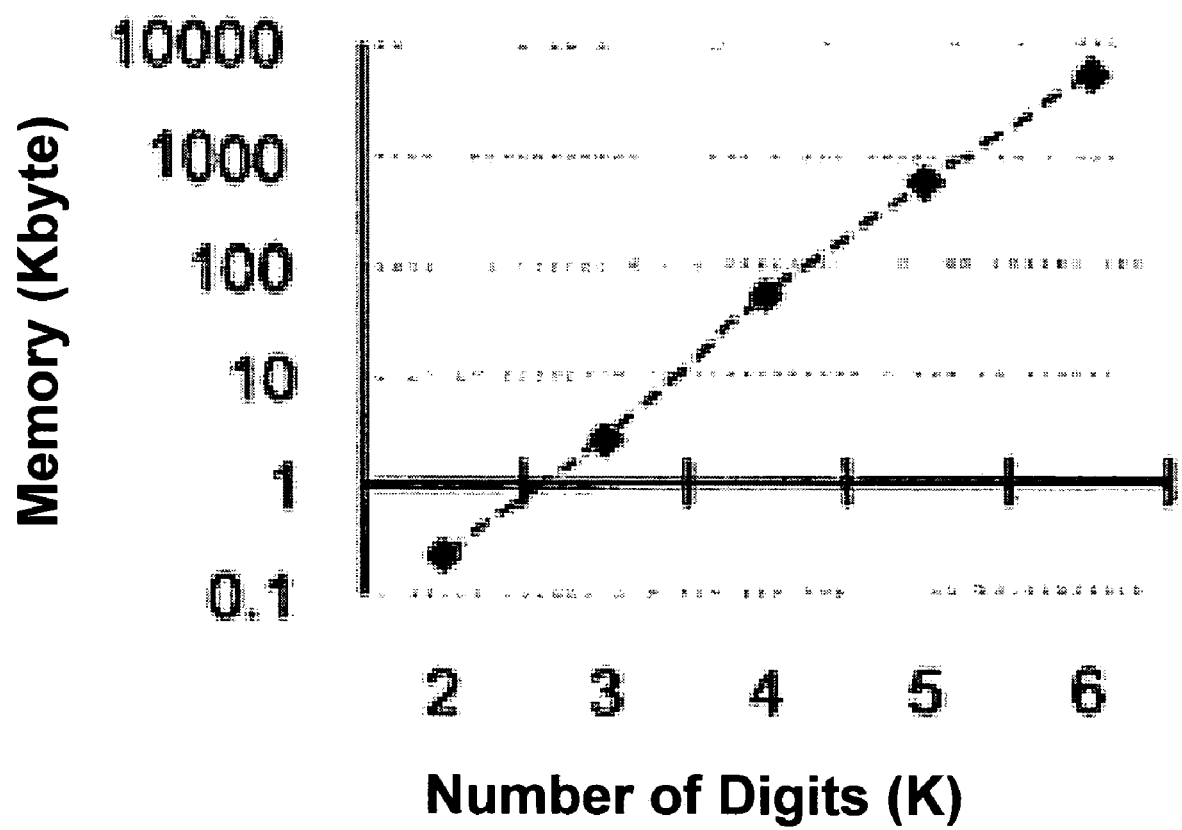
FIG. 6 is a graph describing the memory requirement based on a varying number of index digits.
Figure 7:
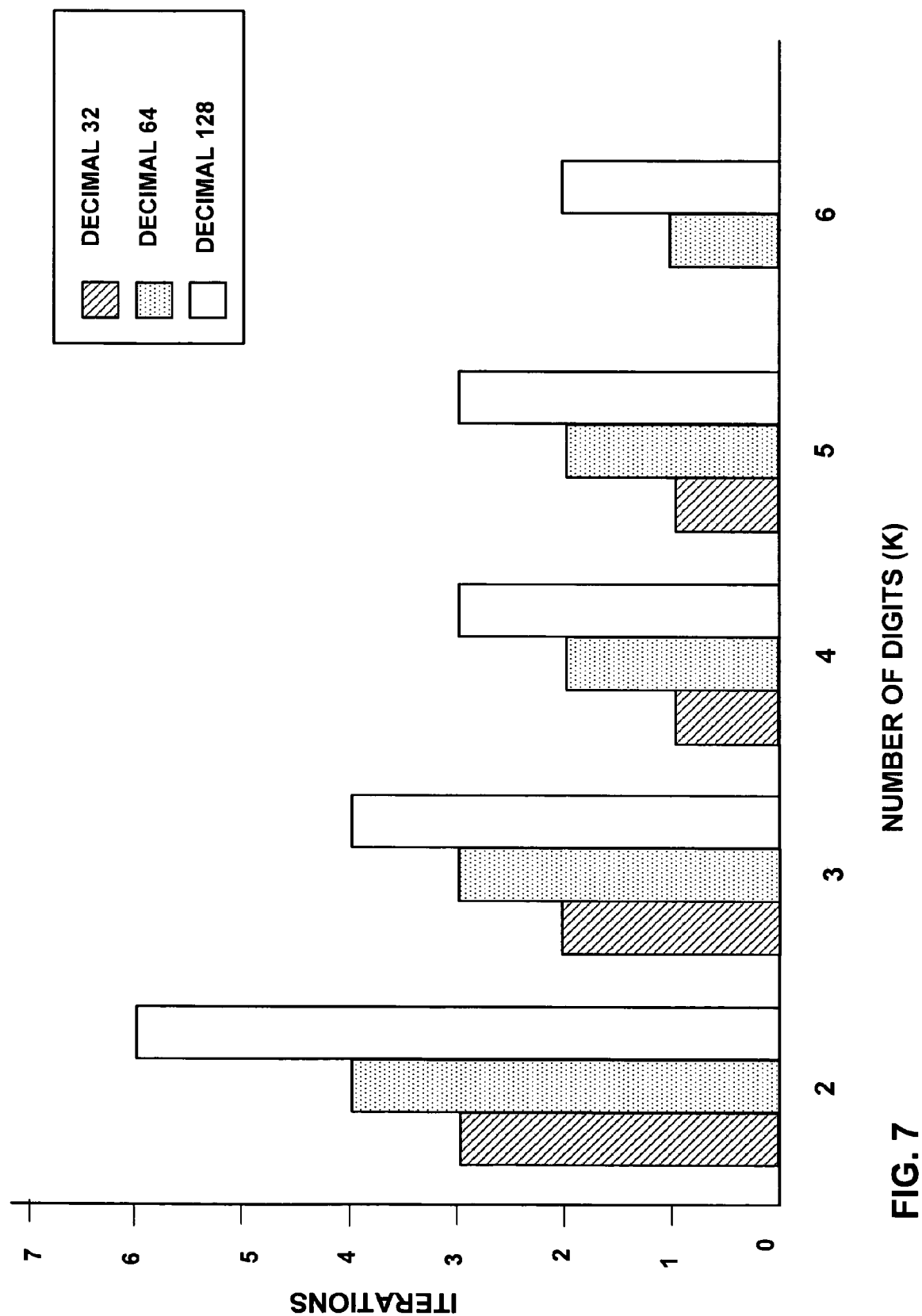
FIG. 7 is a graph presenting the number of iterations required for different decimal formats versus the different number of index digits to the table lookup.

The number of digits used to access the table lookup, k, influences the memory size and the number of Newton-Raphson iterations required. FIGS. 6 and 7 are graphs that show how, in one embodiment of a 64-bit decimal divider, the memory size in KBytes and number of iterations varied with the number of digits used to access the table lookup. Since the inputs and outputs of the table lookup use DPD encoding, which represents 3 decimal digits using 10 bits, the table size was roughly $2^P \times 2p$, where $p=\lceil(k*10)/3\rceil$. Since $R_0$ is accurate to at least 2k−3 fraction digits, $R_m$ must be accurate to at least n+2 fraction digits, and each iteration doubles the number of accurate digits. The number of iterations, m, required to guarantee correct rounding is determined by $$(2k-3) \times 2^m \geq n+2 \qquad \text{(eq. 17)}$$

$$m \geq \log_2(n+2) - \log_2(2k-3).$$

Figure 8:
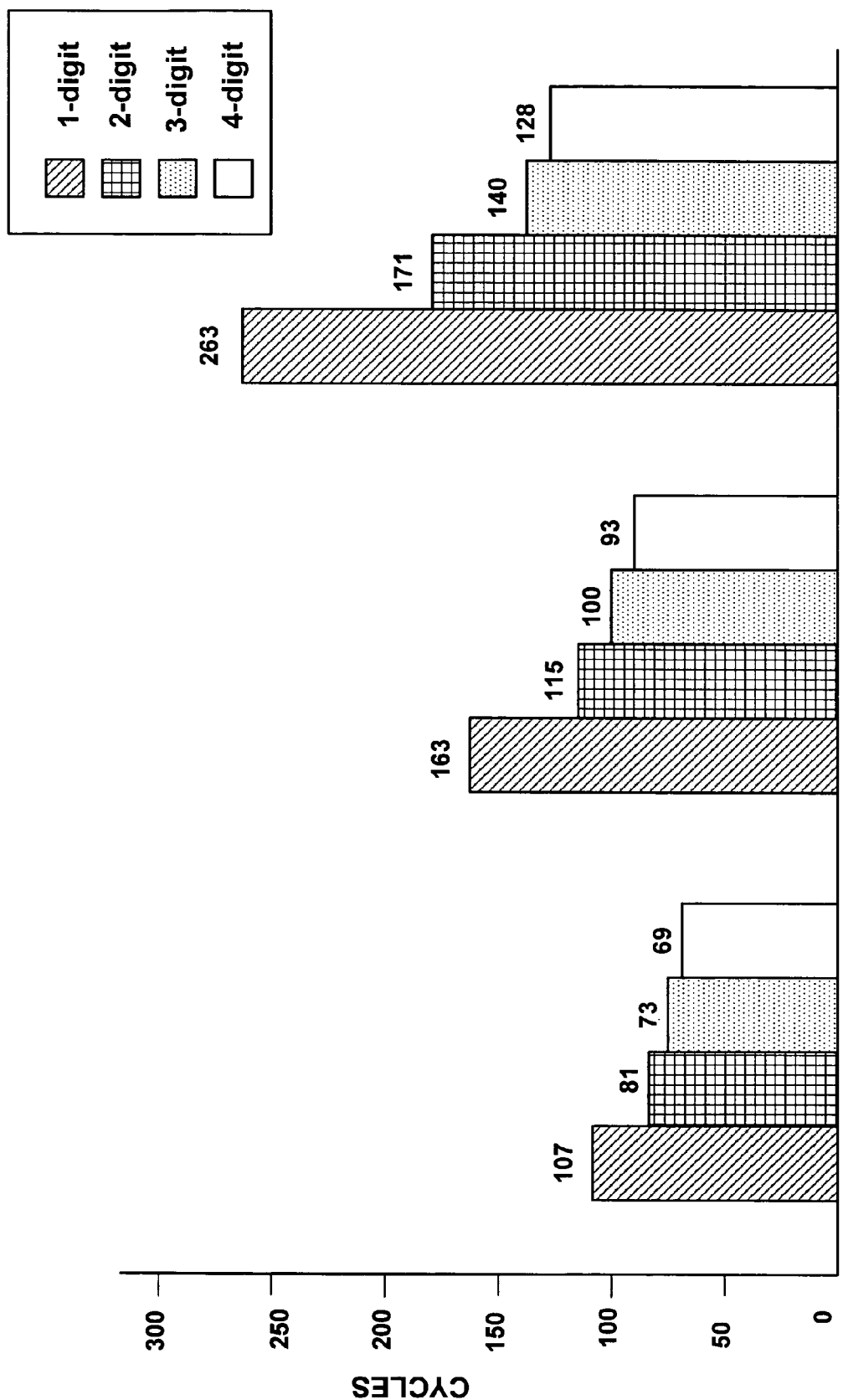
FIG. 8 is a graph illustrating the cycle counts required with three decimal formats with different numbers of decimal digits processed by the multiplier each cycle.
Figure 9:
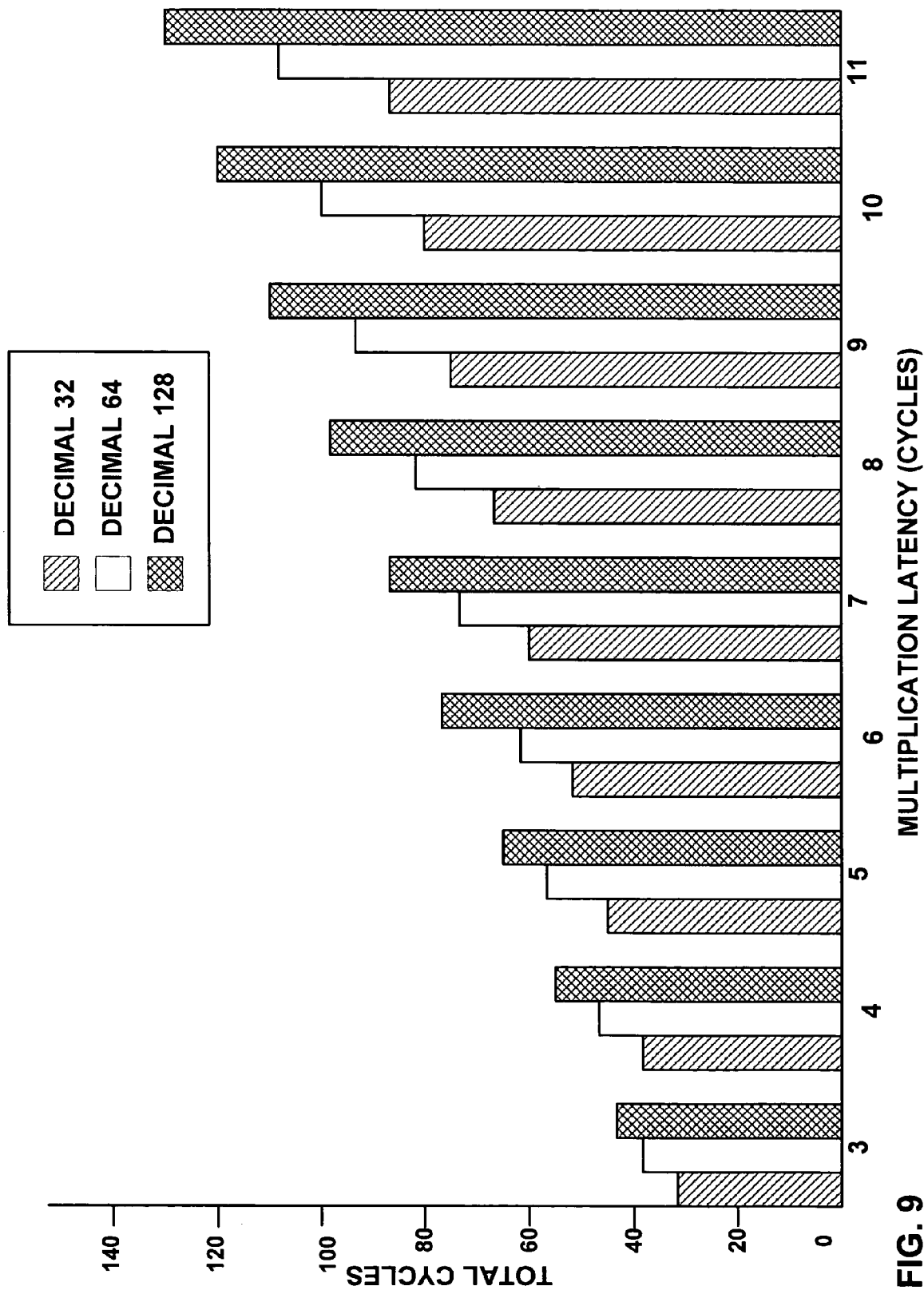
FIG. 9 is a graph illustrating the cycle counts to accomplish a decimal division for three different decimal formats versus the number of cycles required in a full-scale multiplication.

The number of cycles needed to execute the Newton-Raphson floating-point division algorithm described herein depends on the latency of multiplication, the size of the initial table lookup, and the quotient's precision. FIG. 8 is a graph that shows the number of cycles required to execute the described division algorithm when k=3 and the multiplier is capable of processing from one to four multiplier operand digits each cycle. The results in FIG. 8 were generated assuming multiplies are performed in a sequential manner, such that each multiplication takes $6+\lceil n_{mult}/d\rceil$ cycles, where $n_{mult}$ is the number of digits in the multiplier operand and d is the number of digits processed each cycle. Further increasing d yields smaller improvements, due to constant terms in the multiplier and divider latencies and because $n_{mult}$ is less likely to be a multiple of d. If a parallel multiplier capable of performing (n+1)-digit by (n+1)-digit decimal multiplication in P cycles is used and the number of Newton-Raphson iterations required is m, the described Newton-Raphson division algorithm has a latency of 11+P×(3+2×m) cycles. FIG. 9 is a graph that shows the number of cycles required by one embodiment to execute the division algorithm when k=3 and P varies from 3 to 11. Increasing the latency of the fixed-point multiplier may result in a linear increase in the divider latency.

Various embodiments of the invention have been described. These and other embodiments are within the scope of the following claims.

The invention claimed is:

1. A processing circuit comprising a decimal floating-point divider circuit that includes a lookup, circuit that stores decimal data in a densely packet decimal (DPD) format for use in computing an initial approximation of a decimal divisor's reciprocal, a nine's complement circuit and a multiplier circuit to perform Newton-Raphson iterations to output a decimal floating-point quotient.

2. The processing circuit of claim 1, wherein the decimal floating-point divisor circuit comprises input circuits to receive a decimal dividend and the decimal divisor.

3. The processing circuit of claim 2, wherein the decimal floating-point divisor circuit comprises conversion circuits to convert the dividend and the divisor to binary coded decimal (BCD).

4. The processing circuit of claim 2, wherein the dividend and the divisor conform to the IEEE-754 decimal format.

5. The processing circuit of claim 1, wherein the lookup circuit stores a coefficient for use in computing the initial approximation.

6. The processing circuit of claim 1, wherein the lookup circuit is indexed by the k most significant digits of a significand of the divisor in DPD format and outputs the decimal data in DPD format.

7. The processing circuit of claim 1, wherein the decimal floating-point divisor circuit comprises: inputs circuits to receive a decimal dividend and a decimal divisor, wherein the a decimal multiplier circuit to further computes an initial approximation of the divisor's reciprocal.

8. The processing circuit of claim 7, wherein the decimal multiplier circuit performs the Newton-Raphson iterations by performing the Newton-Raphson iterations to compute an improved approximation of the divisor's reciprocal based on the initial approximation.

9. The processing circuit of claim 8, wherein the decimal multiplier circuit performs the Newton-Raphson iterations by multiplying the dividend by the improved approximation of the divisor's reciprocal to produce a preliminary quotient.

10. The processing circuit of claim 9, further comprising:
a rounding circuit to round the preliminary quotient; and
a data post-processing circuit to output the decimal floating-point quotient based on the rounded preliminary quotient.

11. The processing circuit of claim 10, wherein the rounding circuit supports a plurality of selectable rounding modes.

12. The processing circuit of claim 7, further comprising:
a lookup circuit that stores decimal data for use in computing the initial approximation of the divisor's reciprocal, wherein the lookup module is indexed by k most significant digits of a significand of the divisor in DPD format,
wherein the nine's complement circuit performs the Newton-Raphson iterations by calculating an approximation $V \approx (2-X \times R_i)$ by taking the nine's complement of the 2G+2 most significant fraction digits of $X \times R_i$ and setting the integer digit to one, where X represents the divisor, $R_i$ represents the approximation for the divisor's reciprocal for the $i^{th}$ iteration, G=2k−3,
wherein the decimal multiplier circuit performs the Newton-Raphson iterations by further computing an improved approximation for the divisor's reciprocal as $R_{i+1}=R_i \times V$.

13. The processing circuit of claim 12, wherein the decimal multiplier circuit processes one digit per cycle.

14. The processing circuit of claim 7, wherein the decimal multiplier circuit comprises a fixed-point multiplier.

15. The processing circuit of claim 1, wherein the decimal floating-point divider circuit approximately doubles the number of accurate digits for each of the iterations.

16. The processing circuit of claim 1, wherein the decimal floating-point divider circuit processes a 64-bit (16-digit) decimal division in about 150 cycles.

17. A processing circuit comprising a decimal floating-point divider circuit that includes input circuits to receive a decimal dividend and a decimal divisor, a nine's compliment circuit and a multiplier circuit to perform Newton-Raphson iterations to output a decimal floating-point quotient,
wherein the decimal multiplier circuit computes an initial approximation of the divisor's reciprocal according to the following equation:

$$R_0 = \frac{X_m + \overline{X_L} + 10^{-n}}{(X_M + 5 \times 10^{-k-1})^2},$$

where $X_M$ represents a k-digit more significant part of an n-digit divisor, X, and $X_L$ represents an (n−k)-digit less significant part of X.

18. A decimal floating-point divider circuit comprising:
input circuits to receive a decimal floating-point dividend and a decimal floating-point divisor;
a lookup circuit that stores decimal data in a densely packet decimal (DPD) format for use in computing an initial approximation of the divisor's reciprocal,
a nine's complement circuit;
a decimal multiplier circuit;
wherein the lookup circuit, the nine's complement circuit and the decimal multiplier circuit compute initial approximation of the divisor's reciprocal,
wherein the decimal multiplier circuit further (a) performs Newton-Raphson iterations to compute an improved approximation of the divisor's reciprocal based on the initial approximation, and (b) multiplies the dividend by the improved approximation to produce a preliminary decimal quotient;
an incrementer circuit that performs an adjustment to the preliminary decimal quotient to produce a biased decimal quotient,
wherein the decimal multiplier circuit further multiplies the divisor by the biased decimal quotient to generate signals for rounding and correction; and
a processing circuit to output a decimal floating-point quotient based on the biased decimal quotient.

19. The decimal floating-point divider circuit of claim 18, wherein the decimal multiplier circuit approximately doubles the number of accurate digits for each of the iterations.

20. The decimal floating-point divider circuit of claim 18, wherein the decimal multiplier circuit comprises a fixed-point multiplier.

* * * * *